US006958682B2

(12) United States Patent
Lefaure

(10) Patent No.: US 6,958,682 B2
(45) Date of Patent: Oct. 25, 2005

(54) COMMUNICATION METHOD BETWEEN A BADGE AND A MOTOR VEHICLE

(75) Inventor: Philippe Lefaure, Montbrun (FR)

(73) Assignee: Siemens VDO Automotive, Toulouse Cedex (FR)

( * ) Notice: Subject to any disclaimer, the term of this patent is extended or adjusted under 35 U.S.C. 154(b) by 0 days.

(21) Appl. No.: 10/478,485

(22) PCT Filed: Apr. 26, 2002

(86) PCT No.: PCT/EP02/04620

§ 371 (c)(1),
(2), (4) Date: Apr. 23, 2004

(87) PCT Pub. No.: WO02/095690

PCT Pub. Date: Nov. 28, 2002

(65) Prior Publication Data

US 2004/0174248 A1    Sep. 9, 2004

(30) Foreign Application Priority Data

May 21, 2001  (FR) .................................. 01 06638

(51) Int. Cl.⁷ ............................................. B60R 25/10
(52) U.S. Cl. ............................. 340/426.36; 340/5.72; 340/5.61
(58) Field of Search .......................... 340/5.72, 5.61, 340/5.2, 5.6, 10.3, 10.33, 426.36, 825.56, 340/825.69, 825.72

(56) References Cited

U.S. PATENT DOCUMENTS

| 5,252,965 A | * | 10/1993 | Gidwani et al. | ........... | 340/5.23 |
| 6,538,560 B1 | * | 3/2003 | Stobbe et al. | .............. | 340/5.72 |
| 6,714,119 B1 | * | 3/2004 | Mindl et al. | ................ | 340/5.72 |

FOREIGN PATENT DOCUMENTS

| EP | 0 575 013 | 12/1993 |
| EP | 0 848 123 | 6/1998 |
| EP | 1 053 919 | 11/2000 |
| FR | 2 767 595 | 2/1999 |
| FR | 2 779 847 | 12/1999 |
| GB | 2 353 180 | 2/2001 |

* cited by examiner

Primary Examiner—Anh V. La
(74) Attorney, Agent, or Firm—Young & Thompson

(57) ABSTRACT

A communication method between a badge and a vehicle whereby a low range transmitter associated with the vehicle transmits a low frequency signal towards the badge which replies by sending a RF signal of longer range towards the vehicle. A receiver of the badge designed to receive a RF signal is placed in standby mode in accordance with a predetermined rhythm and a transmitter associated with the vehicle sends during a standby phase of the badge a RF signal whereto the badge replies with a RF signal. The invention is applicable to hands-free systems.

10 Claims, 2 Drawing Sheets

COMMUNICATION METHOD BETWEEN A BADGE AND A MOTOR VEHICLE

CROSS REFERENCE TO RELATED APPLICATIONS

This is the 35 USC 371 national stage of international application PCT/EP02/04620 filed on 26 Apr. 2002, which designated the United States of America.

FIELD OF THE INVENTION

The present invention relates to a process of communication between a badge and a motor vehicle provided with a hands-free system.

A hands-free system permits gaining access to a vehicle and starting the latter without having to use a mechanical key. The user of the vehicle is thus simply provided with a badge which is in the form of an electronic card. This badge is detected and recognized by a control and management device associated with antennas disposed onboard the vehicle. If the badge is identified by the control and management device as being a badge authorized for the vehicle, the bearer of the badge can enter the vehicle simply by grasping a door handle and start the motor of the vehicle by simple action on a button.

More generally, for such a hands-free system, a group of antennas is adapted to detect the presence of the badge outside the vehicle and another inside the latter. These antennas are adapted to emit in the direction of the badge an LF (Low Frequency) signal of a frequency typically of the order of 125 kHz. These antennas have a short range, generally of the order of meters. It is thus possible, in a known manner, to locate a badge within or outside of the vehicle.

To locate a badge, a group of antennas, for example internal antennas, emit an LF signal. When a badge located within the vehicle receives this signal, it responds by sending an RF (Radio Frequency) message typically of a frequency of 433 MHz.

Thus the badge is provided with an LF receiver, and an RF emitter, whilst the vehicle is provided with LF emitters and an RF receiver. Only a single RF receiver is needed, because the range of the RF signal emitted by the badge is of the order of tens of meters and all the vehicle can be covered.

The drawback of the communication process described above is that the LF emitting antennas within the vehicle do not always cover all the inside of the latter. Thus, as a function sometimes of the occupancy of the vehicle and given the short range of the LF signals, zones masked from LF reception can exist within the occupant space. Thus, in spite of the presence of a badge within the vehicle, the latter not being detected, functions such as starting the vehicle can be frustrated. The system described above can also locate a badge in the occupant space of the vehicle and not "see" a badge located in a masked region. The vehicle could thus be conventionally lockable and unlockable despite the presence of a badge within the vehicle. If the badge is visible from the outside, a troublemaker could thus break in and take the badge and make off with the vehicle.

SUMMARY OF THE INVENTION

The present invention thus has for its object to provide a process for communication between the badge and the vehicle permitting reliably locating a badge within the latter.

To this end, the process provided is a process of communication between a badge and a vehicle according to which a short range emitter associated with the vehicle emits an LF type signal in the direction of the badge which responds by sending an RF type signal of longer range in the direction of the vehicle. A short range signal can be considered here as a signal which does not cover all of the interior space of the vehicle whilst the longer range signal covers all the interior and all the vehicle.

According to the invention a receiver of the badge adapted to receive an RF type signal is placed on standby according to a predetermined rhythm and an emitter associated with the vehicle sends, during a standby phase of the badge, an RF type signal to which the badge responds with an RF type signal.

In this way, the signal emitted by the vehicle to identify a badge is a long range signal and all the badges located within the vehicle receive this signal and are able to respond to it.

According to an example of embodiment of a process according to the invention, the RF receiver of the badge is permanently on standby. It can also be provided that the badge is alternately on standby to receive LF type signals and then RF type signals.

According to a modified embodiment, the process of communication according to the invention can comprise the following steps:

emission of an LF type signal by a corresponding emitter of the vehicle, reception of the LF type signal by a badge triggering the placing on standby of the RF receiver of the badge, emission of an RF type signal by a corresponding emitter of the vehicle, this signal carrying a question posed to the badge for the identification of this latter, sending a response with an RF type signal of the badge toward the vehicle.

In this process, it can be provided that the LF type signal emitted by the vehicle contains information permitting identifying the vehicle. In this way, the badge is not placed in RF standby as soon as it receives an LF type signal but only when it receives an LF type signal from the corresponding vehicle. The LF type signal is for example emitted by the vehicle according to a locking, unlocking or starting command.

During the phases of movement of the vehicle, checking of the various badges present in the vehicle can be carried out by emitting a signal of the RF type by a corresponding emitter of the vehicle, this signal being the carrier of a question posed to the badge for identification of this latter. The badge thus responds by the emission of an RF type signal carrying a response to the received question.

The present invention also provides a process for managing the presence of badges in a vehicle, according to which the vehicle emits within the vehicle an LF type signal and according to which in response to this signal, each badge having detected the emitted LF type signal, emits in its turn an RF type signal, this signal comprising information permitting identifying the corresponding badge. According to the invention, this process moreover comprises the following steps:

memorization of the list of badges having responded according to a location of the badge by sending an LF type signal, emission of an RF type signal by a corresponding emitter of the vehicle, this signal being the bearer of a question posed to the badge for identification of this latter, sending a response with an LF type signal of the badge toward the vehicle, comparison of the list of badges identified by the identification of the RF/RF type with the list of memorized badges.

In this management process, a signal is preferably given to the driver of the vehicle if it appears during the identification of the RF/RF type of the non-memorized badges. To avoid the detection of badges located immediately adjacent the vehicle without being in the vehicle, this management process provides that the identification of the RF/RF type badges is carried out only during movement of the vehicle.

The present invention also relates to an electronic badge adapted to permit hands-free access to the motor vehicle, comprising a wave receiver of the LF type and a wave emitter of the RF type, characterized in that it also comprises a wave receiver of the RF type. Such a badge is adapted to practice the communication processes described above.

BRIEF DESCRIPTION OF THE DRAWING

The details and advantages of the present invention will become better understood from the description which follows, with reference to the accompanying schematic drawings, in which.

DETAILED DESCRIPTION OF THE INVENTION

Figure 1:
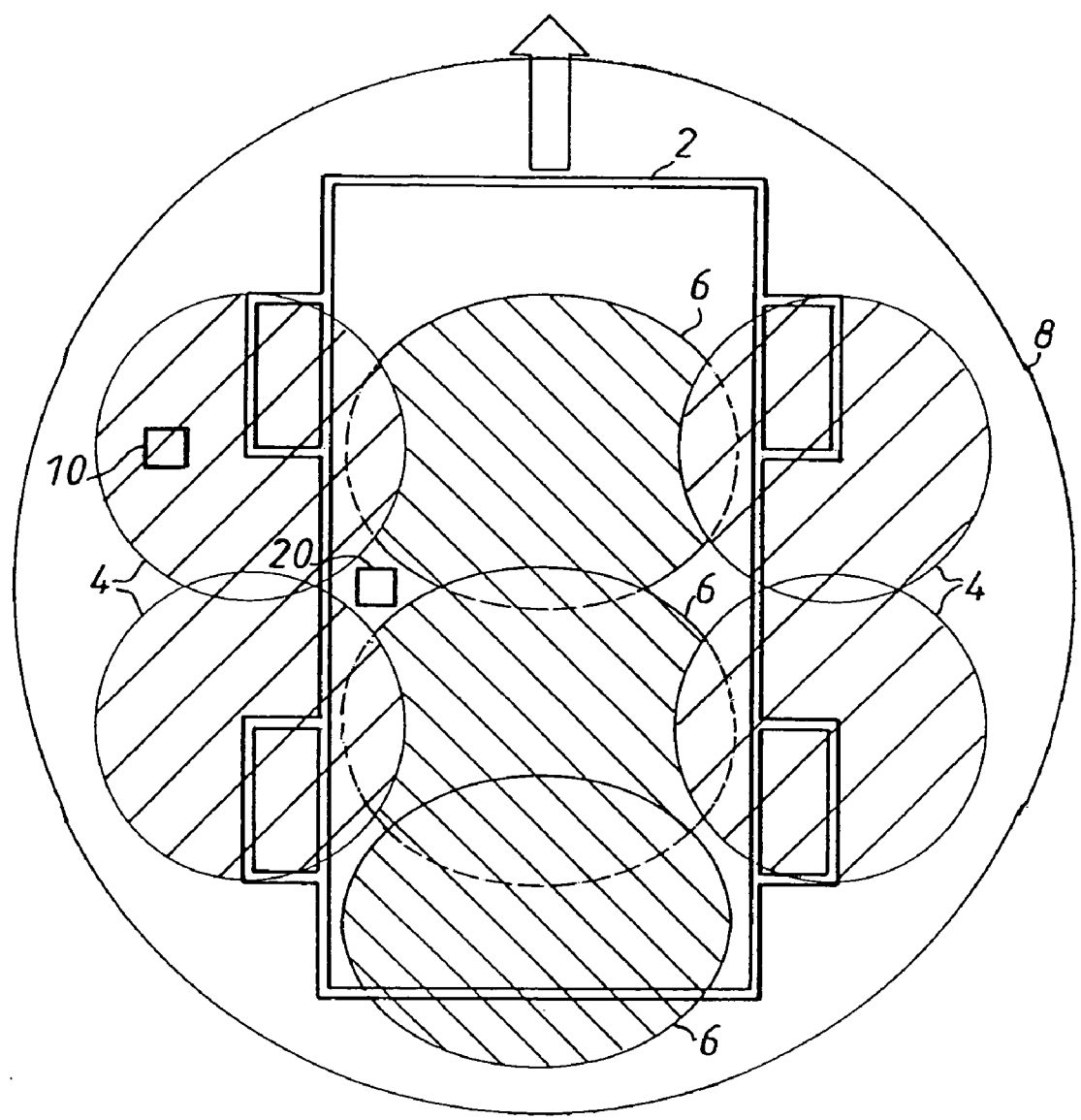
FIG. 1 shows schematically a motor vehicle seen from above.

In FIG. 1, there is shown the different zones covered by the LF (Low Frequency) emitting antennas as well as by an RF (Radio Frequency) antenna associated with the vehicle 2.

There are two groups of LF antennas. A first group of antennas called in what follows the exterior antennas, comprises four antennas disposed in the external handles of the doors of the vehicle 2. The range of each of these antennas is symbolized on the accompanying drawing a crosshatched circle 4. The second group of antennas, called interior antennas, comprises three antennas disposed in the passenger space of the vehicle, for example on the floor of the passenger space. The range of each of these three antennas is symbolized in the drawing by a crosshatched oval 6.

Finally, the RF antenna is disposed in the passenger space of the vehicle 2 and has a range symbolized by a large circle 8 on the drawing. The range of emission of the RF antenna is of the order of tens of meters, for example about 30 meters, whilst the range of emission of the LF antennas is of the order of meters, for example 1 meter.

The signals emitted by the LF antennas, external and internal, have for example a frequency of 125 kHz, whilst the signals emitted by the RF antenna have a frequency of 433 MHz.

All the indications given above as to the number of antennas, as to their position, as to their range or their frequency of emission, are given by way of example.

In FIG. 1, a first badge 10 has been shown by a square. This badge is located outside the vehicle, for example in the pocket of a driver.

Figure 2:
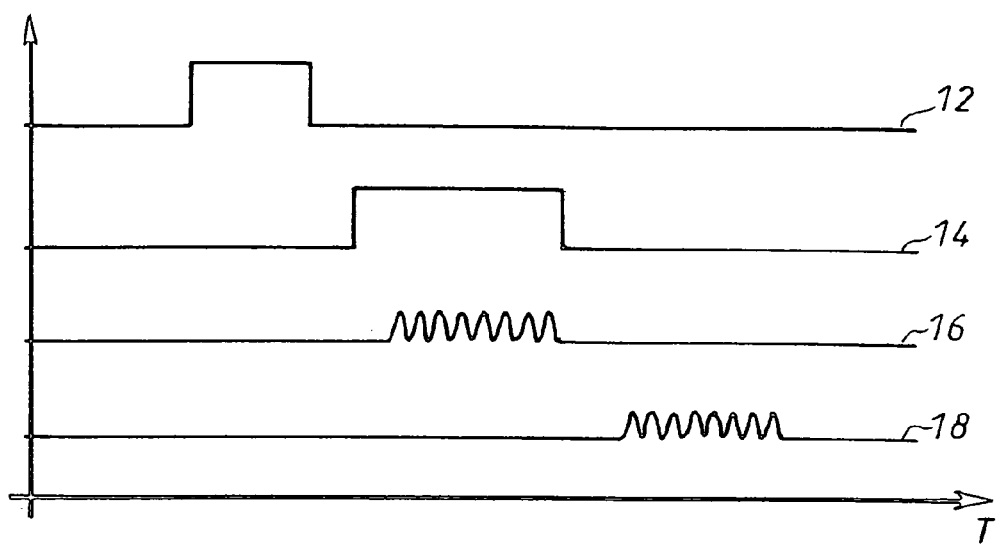
FIG. 2 shows schematically a process for communication prior to unlocking the vehicle.

The process of communication between the first badge 10 and the vehicle is schematically shown in FIG. 2. At the bottom of this figure, there is symbolized the time axis T. A first line 12 shows schematically a signal emitted by the external LF antennas. It will be seen that the first badge 10 is located in an emission zone 4 of an external antenna.

When the driver carrying the badge 10 wishes to open a door, a management device of the hands-free system of this vehicle commands the emission of an LF signal by the external antennas. This signal is symbolized by the curve 12.

In response to this signal, the badge 10 places its RF receiver on standby. This is symbolized by the curve 14 of FIG. 2. It can be provided that the LF signal emitted by the external antennas contains a challenge. In this way, the RF receiver of the badge 10 goes on standby only if the LF signal received is a signal emitted by the corresponding vehicle. It can be a matter of a simple challenge comprising for example only three octets of information.

The RF receiver of the badge 10 being on standby, it is ready to receive the challenge thus emitted by the RF emitter of the vehicle 2. The curve 16 shows the signals emitted by this RF emitter. When the challenge, also sometimes called code, is received by the badge, the RF receiver of the badge 10 becomes inactive. The RF emitting portion of the badge 10 then goes on standby and responds to the management device of the hands-free system. If the response sent by the badge 10 corresponds to the challenge emitted by the RF antenna of the vehicle, then the door of the vehicle will be unlocked.

A similar procedure could be used to start the vehicle. In this case, the LF signal is thus emitted by the internal antennas and no longer by the external antennas, which remain silent.

Such procedures are based on the principle of double communication by rising channel, which is to say from the vehicle toward the badge, the LF one permitting locating the badge and the other RF one whose role is to transmit the data of the challenge. The descending channel, which is to say from the badge toward the vehicle, RF sends the response to the management device of the system.

Figure 3:
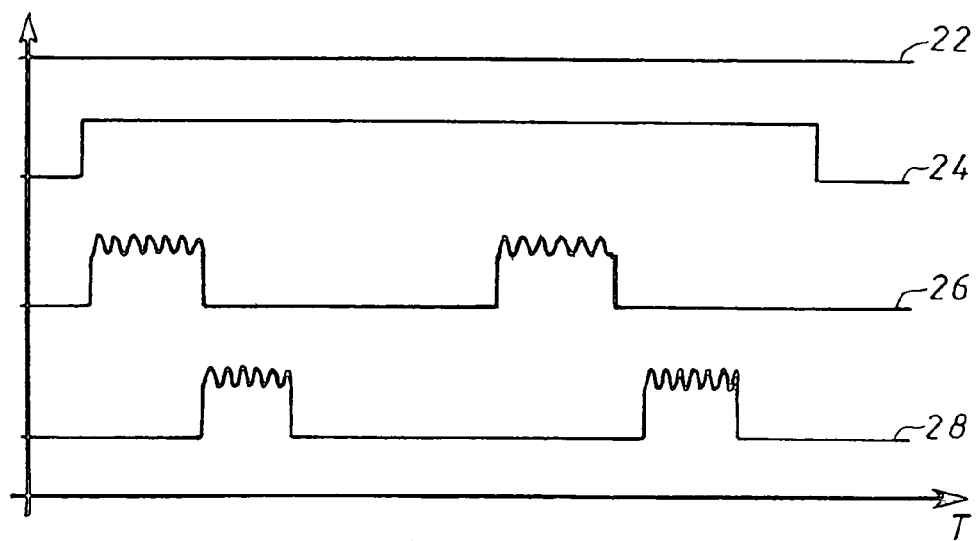
FIG. 3 shows schematically a process for communication for monitoring badges in the vehicle.

FIG. 3 shows schematically a process for communication between the vehicle 2 and a badge during a phase of movement of the vehicle. In this FIG. 3, there will be seen as in FIG. 2, four curves each corresponding to an emitter or a receiver. Thus, the curve 22 corresponds to the LF emitters, the curve 24 to the RF receiver of the badge, the curve 26 to the RF emitter of the vehicle and the curve 28 to the RF emitter of the badge.

According to this procedure, during a moving phase of the vehicle, the LF antennas of the vehicle remain silent. The RF receiver of the badge remains itself on permanent standby. During this time, the RF emitting antenna of the vehicle emits challenges at regular time intervals. These are challenges of a particular type which are sent only during movement of the vehicle for locating the badges. Each badge present in the occupant space of the vehicle 2 thus responds to these challenges by emitting a response (curve 28).

The use of RF signals to communicate between the vehicle and the badge permits communication with all of the badges present in the occupant space of the vehicle.

In FIG. 1, a second badge 20 has been shown inside the occupant space. This badge 20 is located in a region masked from LF reception. As can be seen in this figure, this badge 20 is not located in any of the zones 4 and 6 of emission of the external and internal LF antennas. Although located in the occupant space of the vehicle, the second badge 20 cannot receive an LF signal emitted by the external and/or internal antennas. Thus, if the second badge 20 is forgotten within the vehicle 2, the driver could lock and unlock his vehicle and start it with the help of his first badge 10.

However, the driver does not know with certainty that the second badge is located within the vehicle. If this second badge is visible from the outside, a person up to no good could break in, take this badge, and start the vehicle as if he were the owner.

The communication process described with reference to FIG. 3 permits avoiding this problem. Thus, as indicated above, all the badges present in the vehicle are detected because the emission range of the RF antenna, both of the vehicle antenna and that of the badge, cover completely all the occupant space of the vehicle.

The invention thus also provides a process permitting signaling to the driver the presence of a badge located in a region masked from LF emission. An LF locating signal is thus emitted by the internal LF emitting antennas. The signal is received by all the badges located in the zones 6 (FIG. 1) within the occupant space of the vehicle. Let it be supposed here that the badges are permanently on RF standby. A "conventional" signal of the RF type is thus emitted toward the badges and these which have both received the LF signal and the RF signal respond with an RF signal. The management device thus memorizes which badges send a response following the dispatch of the LF signal. Then, during a moving phase of the vehicle, the badges located within the interior of the vehicle 2 are questioned by a particular location request of the RF type. All the badges, even those located in a region masked from LF emission, then respond to this request. The management device of the hands-free system of the vehicle then compares the list of the badges responding to the LF request, with the list of memorized badges. If these two lists differ, the management device then signals to the driver that a badge is located in a region masked from LF emission.

The communication procedures described above thus permit detecting all the badges present within the occupant space of the vehicle. Thus, during a process of locking the vehicle, the hands-free system must guarantee that there is no badge within the vehicle. Thus, if a badge remained in the vehicle, then by modification of the zones 4 and 6 of LF emission, this badge would become visible to the external LF emitting antennas and would permit thus a third person to unlock the vehicle, recover the badge and also start the vehicle.

The communication processes described above permit solving these problems which arise in processes of communication of the prior art according to which the vehicle sends a challenge to the badge by emission of an LF signal and the badge responds to the vehicle by emission of an RF signal.

The present invention is not limited to the processes described above by way of non-limiting example but covers all modifications of embodiment within the scope of persons skilled in the art, within the scope of the following claims.

What is claimed is:

1. Process for communication between a badge (10, 20) and a vehicle (2) according to which a short range emitter associated with the vehicle emits a low frequency (LF) type signal in the direction of the badge (10, 20) which responds by sending a first radio frequency (RF) type signal of longer range in the direction of the vehicle, characterized in that a search of the various badges present in the vehicle is carried out by emitting an RF type signal (26) by a corresponding emitter of the vehicle, this RF signal bearing a question posed to the badge for identification of this latter, and in that the badge responds by emission of a second RF type signal (28) bearing a response to the received question, and in which the vehicle emits within the vehicle the LF type signal and according to which in response to this signal, each badge having detected the emitted LF type signal, emits in its turn the second RF type signal, this signal comprising information permitting identifying the corresponding badge, characterized in that it comprises moreover the following steps:

memorization of the list of badges having responded to a badge location by sending the LF type signal, emission of the RF type signal by the corresponding emitter of the vehicle, this signal being the bearer of the question posed to the badge for identification of this latter, sending the response with the second RF type signal from the badge toward the vehicle, comparison of the list of badges identified by the RF/RF type identification, with the memorized list of badges, so as to manage a list of badges present in the vehicle.

2. Process for communication according to claim 1, characterized in that a signal is given to the driver of the vehicle if there appear during the RF/RF type identification, un-memorized badges.

3. Process for communication according to claim 1, characterized in that the identification of the RF/RF type badges is carried out only when the vehicle is in motion.

4. Process for communication, comprising the steps of:

emitting from a short range emitter, provided within a vehicle, a low frequency locating signal (12), of a first range, towards mobile badges (10, 20), each badge comprising a low frequency receiver, a radio frequency receiver, and a radio frequency transmitter;

upon receipt of the low frequency locating signal by the badges, the badges each responding by sending a radio frequency first response signal of a second range longer than the first range toward the vehicle;

after the vehicle receiving the first response signals, the vehicle forming and memorizing a first list of LF responding badges having responded to the low frequency locating signal;

emitting from a radio frequency emitter, provided within the vehicle, a radio frequency query identification signal (16, 26) directed to the badges, the query identification signal bearing a question posed to the badges for identification of the badges;

upon receipt of the query identification signal, the badges responding by emission of a radio frequency second response signal (18, 28) bearing a response to the received question toward the vehicle, the second response signal comprising information permitting identifying each badge;

after the vehicle receiving the second response signals, the vehicle forming a second list of RF responding badges having responded to the query identification signal;

the vehicle comparing first and second lists to determine badges not on both the first and second lists; and managing a list of badges present in the vehicle based on the comparison step.

5. Process for communication according to claim 4, comprising the further step, subsequent to the comparison step, of issuing a notification of badges not on both of the first and second lists.

6. Process for communication according to claim 5, wherein, the step of emitting from the radio frequency emitter the radio frequency query identification signal (16, 26) directed to the badges is carried out only when the vehicle is in motion.

7. Process of claim 4, wherein, the first range is less than a range sufficient to cover an entirety of the vehicle, and the second range is at least the range sufficient to cover the entirety of the vehicle.

8. Process for communication between a vehicle and badges, comprising the steps of:

a vehicle emitting a locating signal (12), of a first range, towards mobile badges (10, 20), the first range being less than a range sufficient to cover an entirety of the vehicle;

upon receipt of the locating signal by the badges, the badges each responding by sending a radio frequency first response signal of a second range longer than the first range toward the vehicle, the second range being at least the range sufficient to cover the entirety of the vehicle;

after the vehicle receiving the first response signals, the vehicle forming and memorizing a first list of responding badges having responded to the locating signal;

the vehicle emitting a radio frequency query identification signal (16, 26) directed to the badges, the query identification signal bearing a question posed to the badges for individual identification of each of the badges;

upon receipt of the query identification signal, the badges responding by emission of a radio frequency second response signal (18, 28) bearing a response to the received question toward the vehicle, the second response signal comprising information permitting identifying each badge;

after the vehicle receiving the second response signals, the vehicle forming a second list of RF responding badges having responded to the query identification signal; and the vehicle comparing first and second lists to determine badges not on both the first and second lists.

9. Process for communication according to claim 8, comprising the further step, subsequent to the comparison step, of issuing a notification of badges not on both of the first and second lists.

10. Process for communication according to claim 9, wherein, the step of emitting the radio frequency query identification signal (16, 26) directed to the badges is carried out only when the vehicle is in motion.

* * * * *